May 16, 1944.  G. H. COTE  2,348,727
TOOL HOLDER
Filed Nov. 17, 1942
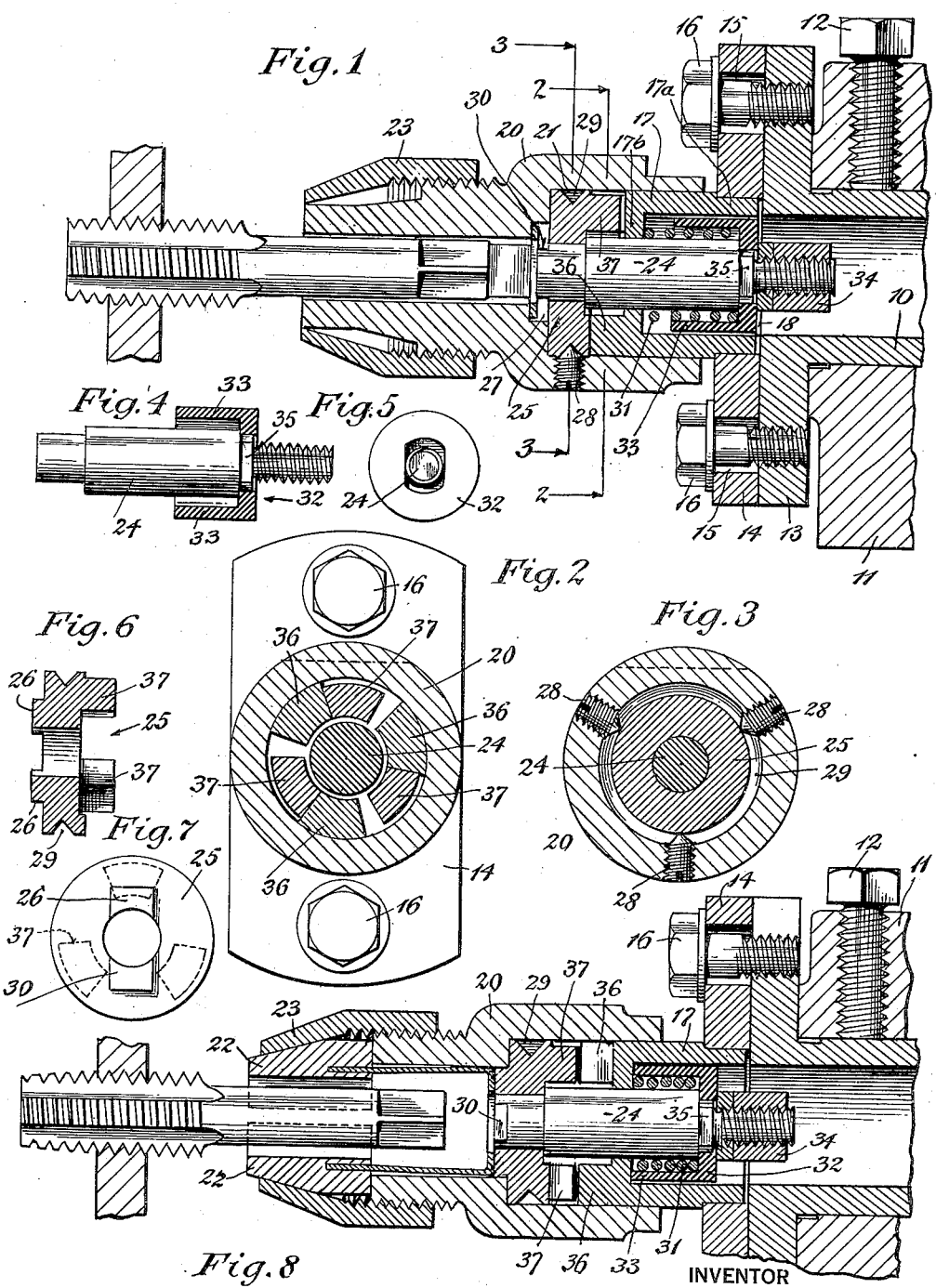
INVENTOR
George H. Cote,
BY Johnson and Kline
ATTORNEYS Patented May 16, 1944

2,348,727

UNITED STATES PATENT OFFICE 2,348,727

TOOLHOLDER

George H. Cote, Bridgeport, Conn.

Application November 17, 1942, Serial No. 465,848

5 Claims. (Cl. 10—89)

This invention relates to a tool holder particularly adapted for use in automatic screw machines, turret lathes and the like for holding a threading tool, such as a tap or a die, and particularly relates to improvements on the tool holder illustrated and described in my Patent No. 2,281,416, granted April 28, 1942.

In the device of my said patent, the means for holding the fixed and relatively movable parts of the holder against rotation for thread cutting is located on the exterior of the parts in which place chips and other foreign matter may become lodged between them and prevent the proper recoupling of the parts at the proper time. Besides, and more important, the engaging surface of the two parts which cooperate to hold the movable part against turning consisted of flat peripheral portions on one member and flat internal portions on the other member. These flat circumferential portions, if sufficient clearance space were provided to permit ready reengagement, and if operated at a high speed, would tend to wear and finally twist out of alignment and lock and bind.

The present invention avoids both these difficulties by providing radially disposed lug means on the interior of the device which can readily engage and disengage and which cannot bind and lock.

In making a tap or drill holder for use in turret lathes, screw machines and the like, it is important that the tool and the rotating work are maintained coaxial. Besides this, with a releasing type tap holder the more nearly concentric the rotatable and stationary parts of the holder the better the results and the less breakage of tools will occur.

The coaxial disposition of the work and tool may be obtained by careful adjustment, but the concentricity of the parts can only be maintained constant by constructing the parts so that they may have substantial bearing surface capable of being hardened and accurately and smoothly finished to size.

This is accomplished by the present invention by providing on the movable part both an external and an internal bearing surface engaging internal and external bearing surfaces in the fixed part.

A feature of the invention is the provision of accurately finished surfaces on the chuck body and the movable clutch part and spring-carrying stud, whereby the latter is accurately centered in and secured to the chuck body to rotate therewith.

Other features and advantages will become apparent from the specification and claims when considered in connection with the drawing, in which:

Figure 1 shows a sectional view of the tool holder of the present invention with the clutch in engagement.

Fig. 2 is a sectional view taken along line 2—2 of Fig. 1.

Fig. 3 is a sectional view taken along line 3—3 of Fig. 1.

Fig. 4 is a fragmentary view partly in section of the spindle and cap thereon.

Fig. 5 is an end view of Fig. 4.

Fig. 6 is a sectional view taken through the driven clutch part.

Fig. 7 is an end view of the clutch part looking from the left in Fig. 6.

Fig. 8 is a view similar to Fig. 1 showing the clutch in released position.

As shown in Figure 1, the holder has a shank 10 extending into a turret 11 and held therein by any suitable means, such as a screw 12, threaded in the turret to bear against the shank. The end of the shank is provided with a flange 13 adapted to have a complementary flange 14 on the chuck holder secured thereto.

The flange 14 is provided with enlarged apertures 15 and a clamping bolt 16 is passed through the apertures and threaded into the flange 13 to lock the two together while permitting limited relative adjustment to insure alignment of the chuck with the work.

A bushing 17 having a reduced neck portion 17a is disposed in a central aperture 18 in the flange and fixed therein as by welding or the like so that the bushing is rigid therewith and projects from the flange a substantial distance. At its outer end the bushing has a transverse wall 17b provided with a central aperture for slidably receiving a stud assembly as will be described.

As shown in Fig. 1, the chuck body 20 is substantially tubular and has a large bore 21 at one end to receive the bushing and mount the body thereon. The bushing-engaging walls of the body and the outer surface of the bushing are hardened and accurately machined so that they are concentric. Thus arranged, the body and bushing are in axial alignment. These contacting surfaces form an elongate bearing surface slidably supporting the body of the chuck on the bushing and accurately guiding the same during movements thereof in the operation of the device.

The body of the chuck at its other end is provided with jaws 22. A cap 23 threaded on the end of the body moves the jaws laterally into clamping relation as is fully explained in my patent.

The chuck body is normally urged to a retracted position on the bushing. This is accomplished by means including a spring-carrying stud 24 which is rigidly secured to a head 25 having an outer diameter which closely fits the bore of the chuck body, whereby the head, when positioned at the inner end of the bore, accurately aligns spring-carrying stud 24 with the chuck body.

The head is positively held against rotation relative to the chuck body by means of a rectangular, or other out-of-round, projection 26, which is received in a recess 27 broached in the adjacent end of the bore of the chuck body. The head is held in interlocked position in the chuck body by means of a plurality of set screws 28 threaded into the body with the ends seated in a V groove 29 in the head. As noted, the end of the stud is slabbed off at 30 and the flat walls engage the walls of the recess to aid in holding it against rotation.

When the chuck body is assembled on the bushing, the stud, which is accurately secured in the chuck body, extends through the aperture 18 in the bushing and is disposed in the bore thereof. A spring 31 is arranged around the stud, and a cap 32 having a depending flange 33 is locked to the end of the stud by a lock nut 34 and is held against relative rotation by the coaction of the flat portions 35 of the stud engaging the flat sides of the stud-receiving opening in the cap as shown in Fig. 5. The flange of the cap surrounds the spring to hold it against lateral displacement and serves as a friction brake as will be described. The spring, extending between the end wall 17b and cap on the stud, urges the stud and the chuck body connected thereto toward the retracted position.

In order to provide a protected and accurate control for the chuck and tool carried thereby, the present invention includes a positively acting clutch between the chuck body and the bushing. The clutch is disposed entirely within and is protected by the chuck body and holds the chuck body against rotation until the end of the tapping operation, at which time it is released and a friction brake is applied to control the rotation thereafter.

The novel clutch is formed by lugs 36 on the projecting end of the bushing and cooperating lugs 37 on the adjacent face of the head 25. With the chuck body in normal retracted position, the lugs are in coupled or interengaged relation as shown in Fig. 1.

As shown in Fig. 2, the lugs are provided with flat contacting faces and those on the head are narrower than the space between the lugs 36 on the bushing and have a reduced outer diameter so that they will readily drop therein when moved into alignment therewith without any binding or other hinderance.

It will be noted that the clutch parts are entirely within and protected by the chuck body in all positions thereof against the entry of chips or other foreign matter which might interfere with their reengagement.

As the tap is drawn into the work the chuck body will be held against rotation by the positively acting clutch parts but will slide along the bearing surface on the bushing and will be steadied and guided thereby. At the end of the tapping operation the chuck body will have moved sufficiently to cause the lugs on the head to be drawn out of engagement with the lugs on the bushing and at the same time cause the flange 33 of the spring-enclosing cap to engage the inner face of the wall 17b of the bushing to apply friction of the braking action to the stud and the chuck body secured thereto.

As soon as the operation is reversed, so that the tool may be removed from the tapping operation, the clutch lugs will reengage and hold the chuck body against rotation.

Variations and modifications may be made within the scope of this invention and portions of the improvements may be used without others.

I claim:

1. A device of the type described comprising a mounting member; a bushing secured thereto and projecting therefrom; a chuck body having chucking means at one end and a bore at the other end having a bearing surface slidingly engaging the external surface of said bushing for axial movement of the body thereon; and lugs on the end of the bushing and cooperating lugs carried by the chuck body to normally hold the bushing and body against relative rotation, said lugs having flat cooperating surfaces and the lugs on one piece being substantially narrower than the spaces between the lugs on the other piece whereby they may readily move into cooperative relation with the flat surfaces in engagement.

2. A device of the type described comprising a mounting member; a bushing secured thereto and projecting therefrom; a chuck body having chucking means at one end and a bore at the other end having a bearing surface slidingly engaging the external surface of said bushing for axial and rotative movement of the body thereon; means for urging the body into a predetermined position on said bushing, including a stud having a head disposed within the bore and having interengaging means for centering the stud therein and holding the stud against rotation with respect to the body.

3. A device of the type described comprising a mounting member; a bushing secured thereto and projecting therefrom; a chuck body having chucking means at one end and a bore at the other end having a bearing surface slidingly engaging the external surface of said bushing for axial and rotative movement of the body thereon; and means for urging the body into a predetermined position on the bushing including a stud passing through the end of the bushing and having a head disposed within the bore, said head and body having an out-of-round cooperating recess and projection for holding said body and stud against relative rotation.

4. A device of the type described comprising a mounting member; a bushing secured thereto and projecting therefrom; a chuck body having chucking means at one end and a bore at the other end having a bearing surface slidingly engaging the external surface of said bushing for axial movement of the body thereon; and means for urging the body into a predetermined position on the bushing including a stud passing through the end of the bushing and having a head disposed within the bore of the body, said head having a machined surface engaging the walls of the bore to accurately position the stud therein.

5. A device of the type described comprising a mounting member; a bushing secured thereto and projecting therefrom; a chuck body having chucking means at one end and a bore at the other end having a bearing surface slidingly engaging the external surface of said bushing for axial movement of the body thereon; means for urging the body into a predetermined position on the bushing including a stud having a head secured in the bore against relative rotation with respect to the body; and means for positively holding the bushing and body against relative rotation comprising lugs carried by the end of the bushing and adjacent the face of the head.

GEORGE H. COTE.